UNITED STATES PATENT OFFICE.

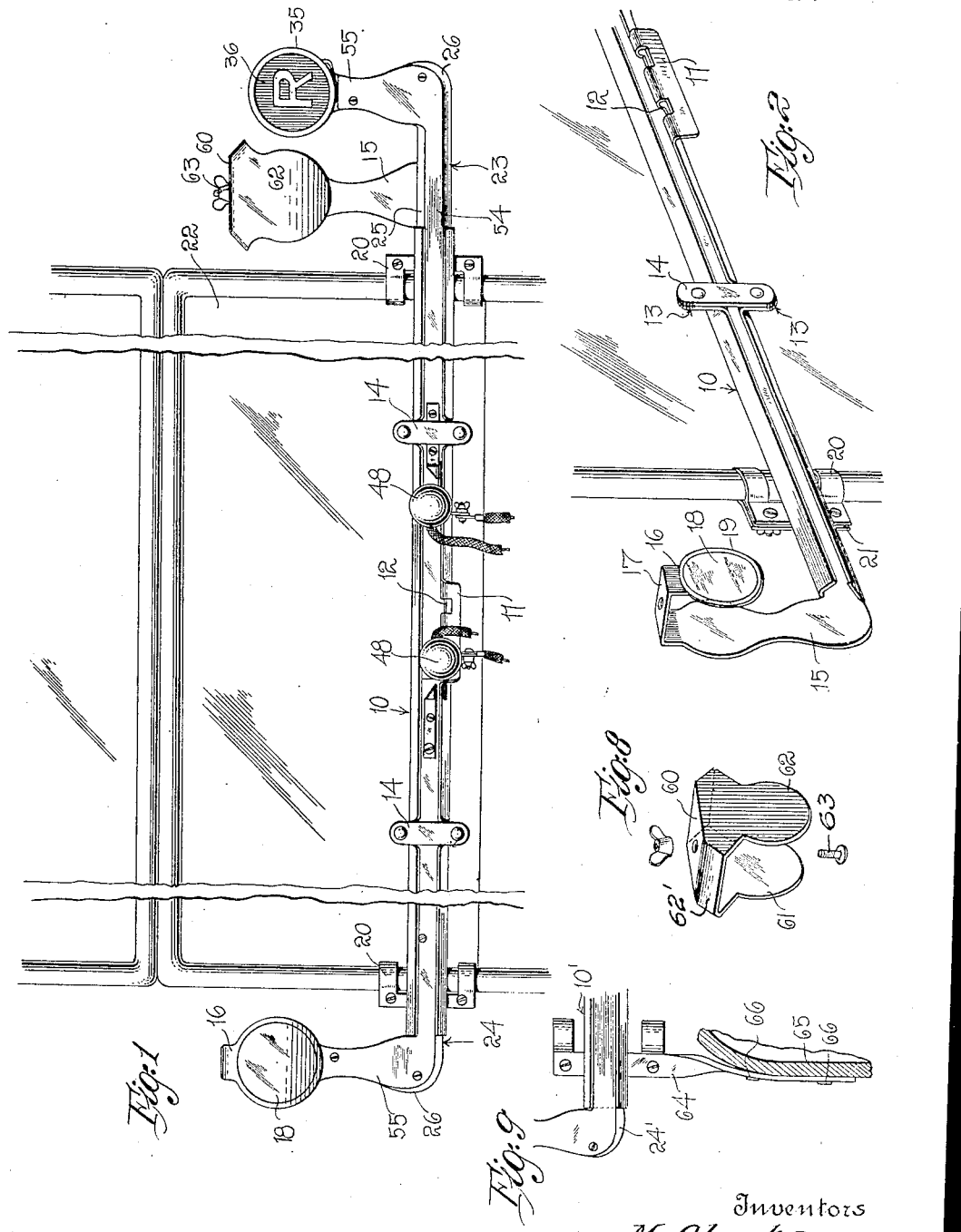

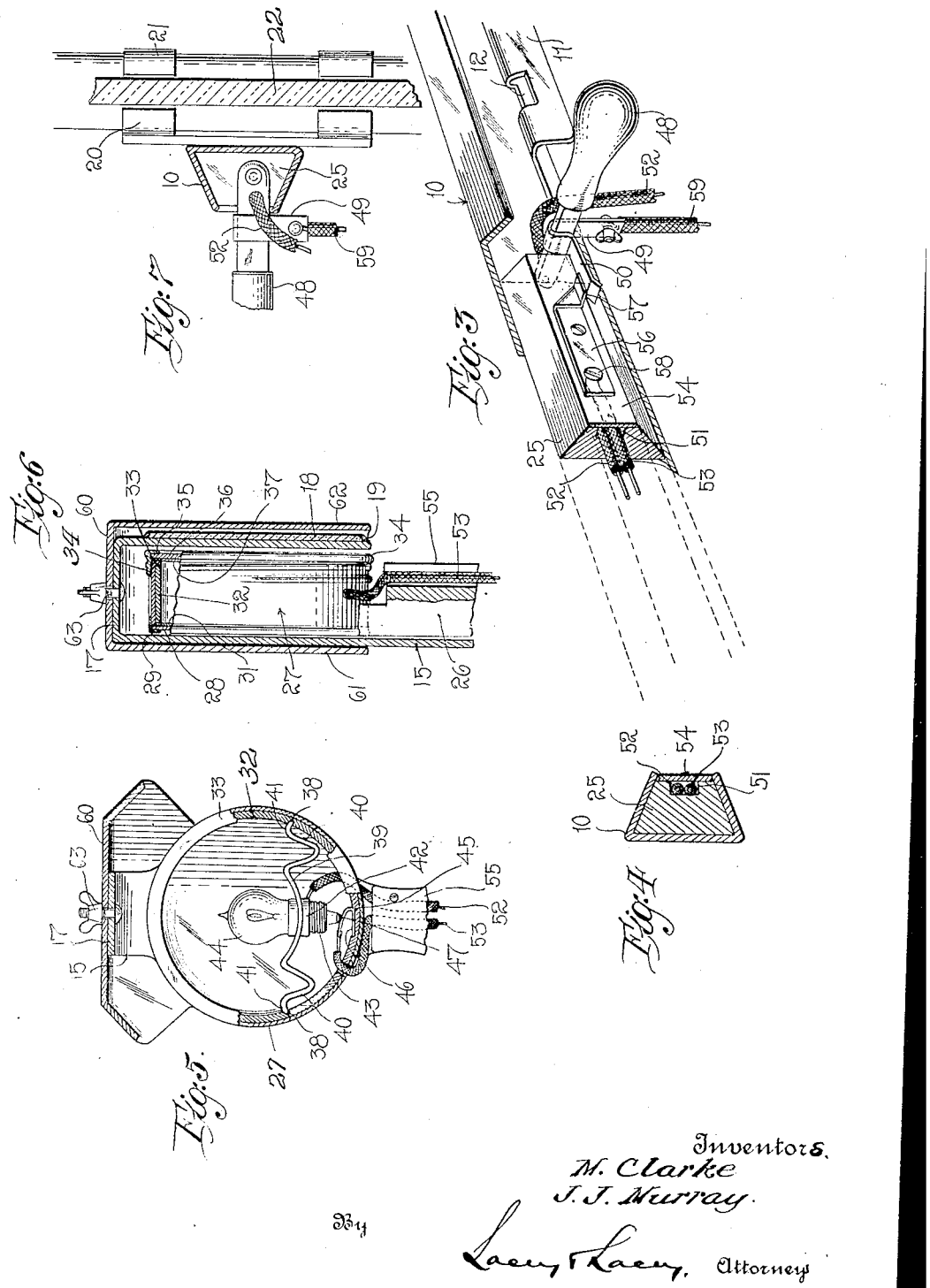

MATTHEW CLARKE AND JAMES J. MURRAY, OF WILKES-BARRE, PENNSYLVANIA, STANLEY CLARKE ADMINISTRATOR OF SAID MATTHEW CLARKE, DECEASED.

DIRECTION-SIGNAL FOR MOTOR-VEHICLES.

1,331,094.  Specification of Letters Patent.  Patented Feb. 17, 1920.

Application filed December 11, 1918. Serial No. 266,231.

*To all whom it may concern:*

Be it known that we, MATTHEW CLARKE and JAMES J. MURRAY, citizens of the United States, residing at Wilkes-Barre, in the county of Luzerne and State of Pennsylvania, have invented certain new and useful Improvements in Direction-Signals for Motor-Vehicles, of which the following is a specification.

This invention relates to an improved direction signal for motor vehicles and has as its primary object to provide a device of this character whereby a driver may readily indicate an intention to turn either to the right or left to thus minimize the possibility of collision between vehicles proceeding in the same direction as well as vehicles proceeding in opposite directions.

The invention has as a further object to provide a device of the above described character employing companion signal members, one of which may be operated for indicating an intention to turn to the right and the other of which may be operated to indicate an intention to turn to the left and wherein said members may be selectively shifted with ease from the driver's seat.

A still further object of the invention is to provide an arrangement wherein operating levers will be employed for the signal members and wherein said levers will normally maintain said members locked in inactive position.

And the invention has as a still further object to provide a signal which may be also employed at night and wherein upon the movement of either operating lever for releasing a corresponding one of the signal members to be shifted to active position, a circuit will be closed through a signal lamp carried by that signal member for thus illuminating the active signal.

Other and incidental objects will appear during the course of the detailed description of the invention. In the drawings, wherein we have illustrated the preferred embodiment of the invention, and wherein similar reference characters designate corresponding parts throughout the several views:

Figure 1 is a fragmentary rear elevation showing our improved device applied to a conventional type of motor vehicle wind shield, this view particularly showing the companion signal members of the device, Fig. 2 is a fragmentary perspective view showing the guide employed for the signal members and illustrating one of the blinds carried by said guide, Fig. 3 is a fragmentary perspective view partly broken away and shown in section, this view showing the mounting of the signal members upon the guide, Fig. 4 is a transverse sectional view taken through the guide and one of the signal members, Fig. 5 is a fragmentary rear elevation showing one of the signaling members, the rear end cap of the lamp casing of such signal being removed and said casing being partly broken away and shown in section to illustrate the mounting of the lamp within the casing, Fig. 6 is a fragmentary sectional view taken at right angles to Fig. 5, Fig. 7 is a fragmentary sectional view showing the mounting of the operating levers for the signal members, Fig. 8 is a detail perspective view showing one of the storm hoods employed for the signal blinds, and Fig. 9 is a fragmentary elevation showing a slightly modified form of supporting bracket for the guide of the device.

In carrying the invention into effect we employ a horizontal guide 10. This guide is preferably formed of suitable sheet metal and is substantially dove-tail in cross section. Formed on the lower flange of the guide medially thereof is a down-turned lug or plate 11 in which are formed spaced notches 12. Projecting from the flanges of the guide at opposite sides of the plate 11 are pairs of oppositely directed lugs 13 to which are secured plates 14 connecting said flanges and rigidly supporting the flanges with respect to each other. Upstanding from the guide at its ends are blinds 15, each including a front plate integral with the guide and a back plate 16 supported in spaced parallel relation at the rear of the front plate by a substantially U-shaped connecting portion 17. Mounted upon the back plates of said blinds are mirrors 18 which, as shown in detail in Fig. 6, are held by flanges 19 formed from the plates to engage over the peripheries of the mirrors. Riveted or otherwise secured to the guide 10 adjacent its ends are clamp members 20 and coacting with these clamp members are similar clamp members 21 adjustably connected with the members 20 by bolts or other suitable fastening devices and adapted to engage the vertical side bars of the frame of a motor vehicle wind shield, as particularly shown in Figs. 1 and 2 of the drawings, for securing the bars in position at the rear of the wind shield. For convenience, we have conventionally illustrated the wind shield at 22 and as will now be observed, the guide 10 projects somewhat beyond the opposite ends of the shield to support the blinds 15 in upstanding position at opposite sides of the vehicle.

Mounted to slide within the guide 10 for movement to active position at opposite sides of the vehicle, are right and left signal members respectively indicated as a whole at 23 and 24. Since these members are identical in construction, only one will be described in detail, the left signal member being chosen. However, similar reference numerals will be duplicated upon corresponding parts of both of said members. Referring now particularly to Fig. 3, it will be seen that the left signal member includes a body bar 25 substantially dove-tail in cross section to slidably fit within the adjacent end of the guide 10. At its outer end this bar is formed with an upstanding standard 26 integral with the bar and mounted upon the upper end of this standard is the left hand signal. This signal includes a lamp casing 27 in the front end of which is a transparent pane 28 held by a peripheral flange 29 on the casing and lying against the inner face of said pane is a translucent color screen 31. This screen may be formed of fabric and is preferably colored red. Confined between the screen and the pane is a direction letter L, indicating left, this letter being pasted or otherwise secured upon the screen. However, if preferred, the letter may be simply painted or otherwise imposed upon the screen or, if desired, the letter may be painted or otherwise imposed upon the front pane 28. Snugly fitting within the lamp casing is an annular insulating strip or band 32 lying against the peripheral wall of the casing and abutting at its forward edge with the screen 31. Formed on the casing at its rear edge is an inwardly directed annular flange 33 engaging the rear edge of the band and acting to clamp the band within the casing binding against the screen. Consequently, the screen 31 will be held by the hand to lie smoothly against the inner face of the front pane 28 of the casing. Removably fitted upon the rear end of the casing is a closure therefor including a ring 34 surrounding the casing and threaded thereon. This ring is provided at its outer edge with an inwardly directed flange against which seats a transparent back pane 36 for the casing and rested against this back pane is a screen 37. As will be clear, the ring 34 may be adjusted inwardly upon the casing for clamping this screen between the back pane and the wall of the casing and thus firmly holding the screen to smoothly overlie the back pane at its inner face. The back screen is similar to the front screen, being preferably formed of suitable fabric colored red and lying between the screen and the back pane 36 is another direction letter L, which may be provided in the manner described with respect to the former letter. Thus, it will be seen that a direction letter will be displayed both at the front and rear of the signal. In this connection it will, of course, be understood that front and rear direction letters R indicating right, are employed in connection with the signal of the right signal member 23.

Formed in the inner face of the insulating band 32 adjacent the lower side of the casing 27 are oppositely disposed transverse notches 38 in which are engaged the terminals of a transversely extending lamp socket supporting strip 39. This strip is preferably formed of suitable resilient sheet metal and, adjacent its ends, is rebent upon itself to provide spring arms 40 having laterally directed terminals 41 resiliently held by the arms to seat within said notches. This construction provides an arrangement whereby the strip will be normally held firmly in place while at the same time, the strip may, when desired, be easily removed. Pressed out from the strip medially thereof is a downwardly directed annular electric lamp socket 42 and removably threaded through this socket is the plug or base 43 of an electric signal lamp, as conventionally shown at 44. Formed in the insulating band 32 beneath the socket 42 is a transverse slot or recess 45 and engaged within this recess is a contact member 46. This contact member is also preferably formed from a strip of suitable resilient sheet metal rebent upon itself to frictionally engage within said recess and to provide an upwardly directed spring arm 47 extending beneath the lower terminal of the lamp plug 43 and contacting therewith. It will thus be seen that the plug may be rotatably adjusted within the socket 42 for moving said plug into binding contact with the spring arm 47 which will thus be compressed to in turn yieldably hold the contact member 46 engaged within the recess 45.

Pivoted upon the inner end of the body bar 25 of the signal member is an operating lever 48 to the shank of which is secured in any approved manner a contact member 49 having a spring arm 50 extending horizontally and laterally from the lever at its inner side along the front face of the body bar. Formed in the front face of the body bar is a longitudinally extending channel 51, which, at the outer end of the bar is continued upwardly within the front face of the standard 26 to open through the upper end of said standard at the lamp casing 27. Mounted within this channel are circuit wires 52 and 53 respectively and retaining these wires in position within the channel is a cover plate 54 for the channel. This cover plate is removably secured to the front face of the body bar by screws or other suitable fastening devices and, at its outer end is provided with an upwardly directed terminal 55 conforming in outline to the outline of the standard 26 and similarly secured to the front face of said standard for overlying the portion of the channel 51 within the standard. Connected to the cover plate 54 adjacent its inner end is a contact member 56 provided with a laterally and forwardly directed arm 57 extending over the arm 50 of the contact member 49 and adapted to coöperate therewith. As will now be observed, the wire 52 is, as particularly shown in Figs. 3 and 7 of the drawings, led through a suitable opening in the inner end of the operating lever 48, into the channel 51 and, at the lamp casing 27, is carried through the wall of said casing and suitably connected to the lamp socket 42. At its adjacent end the wire 53 is suitably connected to the spring arm 47 of the contact member 46 while the opposite end of said wire is electrically connected with the contact member 56, as shown at 58. Leading from the contact member 49 is a wire 59 which may be connected to a battery or other suitable source of electrical energy upon the vehicle, as is also the free terminal of the wire 52.

As will now be observed upon reference to Fig. 1 of the drawings, the operating lever 48 is normally engaged within the left hand notch of the plate 11 for locking the signal of the member 24 inactive disposed behind the blind 15, when the front face of the signal will be concealed by the front plate of said blind while the rear face of the signal will be concealed by the rear plate 16 of the blind. For displaying the signal, the lever 48 is swung upwardly and upon being freed from the plate 11 is then operated to shift the signal member outwardly upon the guide when the signal of said member will, in the manner illustrated in Fig. 1 in connection with the right signal, be projected beyond the blind 15 into active position for display. Then, when the signal has been given, the lever 48 is again operated for shifting the signal member inwardly to return the signal thereof to its original position. In this connection, it will be noted that the plate 14 at the adjacent end of the guide 10 will be engaged by the operating lever 48 to form a stop limiting the signal member in its outward movement while the standard 26 of the member will engage the adjacent outer end of the guide for limiting the member in its inward movement. In the daytime, the signal letters of the signal will be easily discernible. However, at night it becomes necessary to illuminate the signal. Accordingly, a suitable switch, which may be of any approved character and therefore has not been shown, may be included in the circuit with the signal lamp 44. By closing this switch, movement of the lever 48 to free the signal member will, as will be readily understood upon reference to Fig. 3, swing the arm 50 of the contact member 49 upwardly into engagement with the arm 57 of the contact member 56 for closing a circuit through the signal lamp. Thus, this lamp will be energized simultaneously with the release of the signal member so that when said member is shifted outwardly to display the signal, said signal will be illuminated, and owing to the presence of the screens 31 and 37 within the lamp casing 27, a red signal light will be seen. When the signal member is again shifted to inactive position, movement of the lever 48 to lock the signal inactive will again break the circuit through the signal lamp for extinguishing the lamp. The right hand signal is operated in a manner identical with the operation of the left hand signal as just described. We, therefore, provide a very effective construction for the purpose set forth and a device which may, as will be understood in view of the preceding description, be readily actuated from the driver's seat of the vehicle for giving a signal of the intention of the driver to turn either to the right or left.

As a means of protecting the signals of the device from the weather, when desired, we provide storm hoods therefor. One of these hoods is shown in detail in Fig. 8 of the drawings, and as there illustrated, each includes a body 60 from opposite ends of which depend spaced parallel front and back plates 61 and 62 respectively. In Fig. 1 the hood for the left hand signal is removed while the hood for the right hand signal is shown in place. The storm hoods are, as particularly shown in Figs. 5 and 6, adapted to fit over the upper ends of the blinds 15, resting upon the connecting portions 17 of the plates 16 of said blinds, so that the plates 61 thus overlie the upper end portions of the front plates of the blinds while the plates 62 overlie the mirrors 18 and plates 16 of the blinds. The sides 62' of the hood are inclined downwardly and outwardly and overhang and protect the signal from rain and snow. The bodies 60 of the hoods are relatively wide so as to project over the signals at opposite sides thereof and formed through said bodies as well as through the connecting portions 17 of the blinds, are suitable openings which removably receive bolts or other suitable fastening devices 63 for detachably securing the hoods in place.

In Fig. 9 of the drawings, we have shown a slightly modified form of attaching member for the guide 10 to be used in any instance where a vehicle is not provided with a wind shield. In this figure the guide is indicated at 10' and the adjacent left hand signal member at 24', these parts being identical with corresponding parts of the preferred construction. Riveted or otherwise secured to the guide adjacent its ends are attaching members 64. These members are formed of suitable metal strips and, intermediate of their ends, are given a half turn so as to seat flat against the side of a vehicle body, a portion of such body being shown at 65. Securing the lower ends of the attaching members to the body are rivets or other suitable fastening devices 66 so that said members will thus rigidly support the device upon the vehicle.

Having thus described the invention, what is claimed as new is:

1. A device of the character described including a guide, a blind carried thereby, and a signal member slidable upon the guide and including a signal normally screened by said blind, said signal comprising a casing, transparent panes arranged in the front and back of the casing, screens overlying said panes, and direction indicia disposed between the screens and the panes.

2. A device of the character described including a guide, a blind carried thereby, and a signal member slidable upon the guide and including a signal normally screened by said blind, said signal comprising a casing, transparent panes arranged in the front and back of the casing, and a signal lamp disposed within the casing.

3. A signal including a support having its outer end portions extending upwardly and bent in U-shaped formation for forming a blind, a signal device carried by the support and having an indicator slidably arranged between the sides of said U-shaped blind, and a U-shaped storm hood having its bight portion detachably secured to the bight portion of said blind and having downwardly and outwardly inclined sides overhanging said indicator.

4. A signal including a guide having flanges along its edges, a signal member slidably arranged and confined between said flanges, an indicator carried by the outer end of said signal member, oppositely directed lugs carried by said flanges, elongated plates traversing said guide and secured to said oppositely directed lugs for strengthening said flanges, and an operating handle secured to said signal member and adapted to engage said elongated plate for limiting the outward movement of the signal member.

5. A device of the class described including a guide having inwardly directed flanges along its longitudinal edges, a dovetailed bar slidably carried by said guide and in contact with said inwardly directed flanges, an indicator carried by the outer end of said dovetailed bar, a downturned plate formed integral with one of said flanges and having a slot in its upper portion, a pivoted operating handle carried by the inner end of said dovetailed bar and adapted to be received within the slot of said downturned plate for locking the dovetailed bar against movement, an elongated plate traversing said guide intermediate its ends and secured to said flanges for strengthening the same, said handle being adapted to engage said transversely extending elongated plate for limiting the outward movement of said dovetailed bar, and means to conceal said indicator when the same is in inoperative position.

In testimony whereof we affix our signatures.

MATTHEW CLARKE. [L. S.]
JAMES J. MURRAY. [L. S.]